United States Patent

[11] 3,610,832

[72] Inventor Henry A. Strobel
San Francisco, Calif.
[21] Appl. No. 842,299
[22] Filed July 16, 1969
[45] Patented Oct. 5, 1971
[73] Assignee Lynch Communication Systems, Inc.
San Francisco, Calif.

[54] APPARATUS FOR ADAPTING PCM TELEPHONE SYSTEMS TO MULTIPLEXED TELEGRAPH USE

7 Claims, 5 Drawing Figs.

[52] U.S. Cl. .......... 179/15 BY, 179/2 DP, 179/3
[51] Int. Cl. .......... H04j 3/00
[50] Field of Search .......... 179/2 DP, 3, 4, 15 BY, 15 BV, 15 BM, 178/50

[56] References Cited

UNITED STATES PATENTS 3,310,631 3/1967 Brown .......... 179/15 BY
3,492,434 1/1970 Michel .......... 179/15 BY

*Primary Examiner*—Ralph D. Blakeslee
*Attorney*—Mellin, Moore & Weissenberger

ABSTRACT: One or more of the channels of a conventional T-1 type PCM telephone system can be used for the multiplexed transmission of seven telegraph signals by a time-sharing sampling of the telegraph signals. To make the telegraph channel signals compatible with voice channel signals, which have an inherent phase delay, the enabling of the telegraph channel is delayed a corresponding amount. The telegraph channel is also shortened to allow for the insertion of frame and signalling pulses produced by the voice equipment independently of telegraph information. The telegraph channel signal is decoded by means of bistable latch circuits driving logic level converters. A master clock convertible between internal and external clocking modes is provided.

INVENTOR
HENRY A. STROBEL

BY

Mellin, Moore + Weissenberger
ATTORNEYS

PATENTED OCT 5 1971 3,610,832

INVENTOR
HENRY A. STROBEL

BY

Mellin, Moore & Weissenberger
ATTORNEYS

INVENTOR.
HENRY A. STROBEL
BY
Mellin, Moore & Weissenberger
ATTORNEYS

INVENTOR
HENRY A. STROBEL

BY

*Mellin, Moore & Weissenberger*

ATTORNEYS

APPARATUS FOR ADAPTING PCM TELEPHONE SYSTEMS TO MULTIPLEXED TELEGRAPH USE

BACKGROUND OF THE INVENTION

This invention relates to pulse code modulated (PCM) telephone systems. The most common type of PCM telephone system (the so-called T–1 type) operates on the principle of digitalizing voice signals into a 7-digit binary code and transmitting that code in the form of the presence or absence of bits in a clocked pulse train. The T–1 pulse train is time-shared by 24 channels, each conveying different information.

In order to provide for increased utilization and versatility of PCM systems, it is desirable to adapt them not only for voice transmission but also for telegraph transmission. In such a system, it would be possible to transmit e.g. seven multiplexed telegraph signals over the same channel of a T–1 system by assigning one of the seven digits of the binary quantizing signal of the voice system to each telegraph signal.

However, certain problems of logic level conversion, clocking, and phase shift within the voice quantizing equipment prevent immediate compatibility of the voice processing equipment with a telegraph input. The present invention is designed to solve these problems.

SUMMARY OF THE INVENTION

In accordance with the invention, discrete telegraph signals are cyclically sampled by a ring counter, which may be provided with means for preventing spurious counting modes. Phase shift is artificially introduced into the sampled signal by delaying the initiation of the first bit, it being understood that only the central portion of each bit is utilized in eventually producing the final output signal.

The voice signal consists of seven bits, and an eighth bit is inserted into the voice signal prior to transmission through the line for signalling purposes. Individual 24-channel frames of the transmitted pulse train are furthermore separated by frame pulses.

Provision is made to insure that signal pulses are transmitted in each 8-bit group assigned to a telegraph channel (during normal operation) to provide at least one pulse in every eight, thus providing adequate excitation to the clocks of the line repeaters without placing constraints on the telegraph data.

In the standard T–1 system, the so-called "remote" alarm condition is indicated by inhibiting all signalling bits and all least significant data bits. In the adapted system, the signalling bits are enabled in the usual way during a "remote" alarm condition, but since the telegraph bits (including the one corresponding to the least significant voice bit) are multiplexed into the bit stream at a subsequent point, additional means are provided by the invention to suppress the seventh (least significant) bit during a remote alarm condition.

Furthermore, in adapting the system to telegraph requirements, means are provided in the apparatus of this invention to utilize the clock circuitry either as an internally controlled clock or as an externally controlled clock which may be operated either by master clock signals supplied as a part of the telegraph system or by clock signals derived from the received pulse train for synchronization of the PCM network.

It is therefore the object of the invention to apparatus which makes a voice PCM system adaptable for use with telegraph signals.

It is a further object of the invention to provide a system of the type described which can be operated either in an internally clocked mode or in a mode synchronized by external control

DESCRIPTION OF THE PREFERRED EMBODIMENTS

Figure 1A:
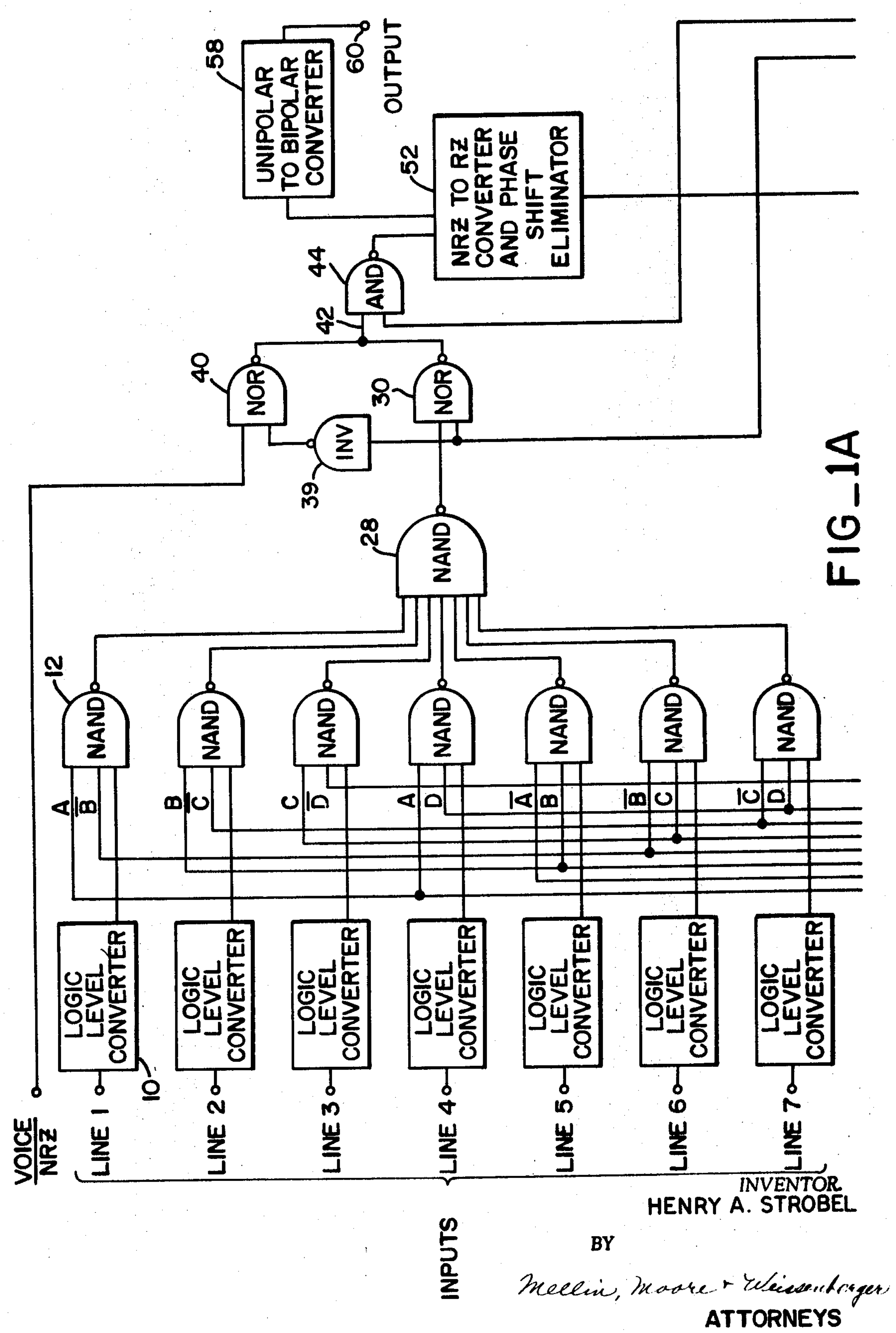
FIGS. 1A and 1B illustrate a block diagram of the apparatus of this invention.
Figure 1B:
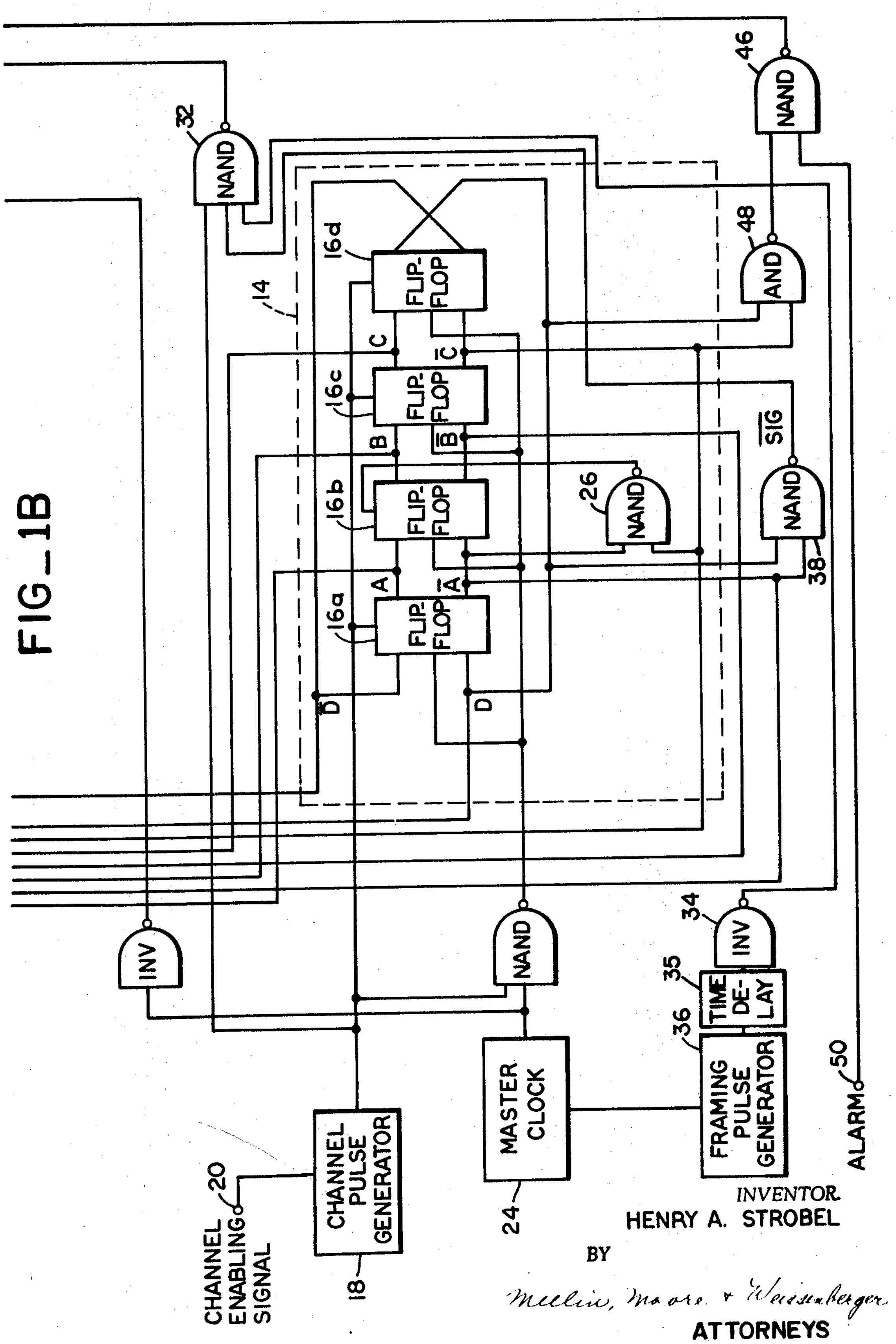

In FIG. 1, the seven separate telegraph inputs appear at the terminals designated as "Line 1" through "Line 7." Each of these signals are separately processed through a logic level converter and line terminator 10 which, by conventional means, transforms the 600 ohm ±12 volt logic levels representing the mark and space conditions of the standard telegraph signal into the 0 and 5 volt logic levels used in the standard PCM system.

The outputs of the seven logic level converters 10 each constitute one of the three inputs of the seven NAND gates 12. The other two inputs of each NAND gate 12 are derived from the ring counter 14 which consists of four double-rail flip-flop circuits **16*a* through 16*d***.

Figure 3:
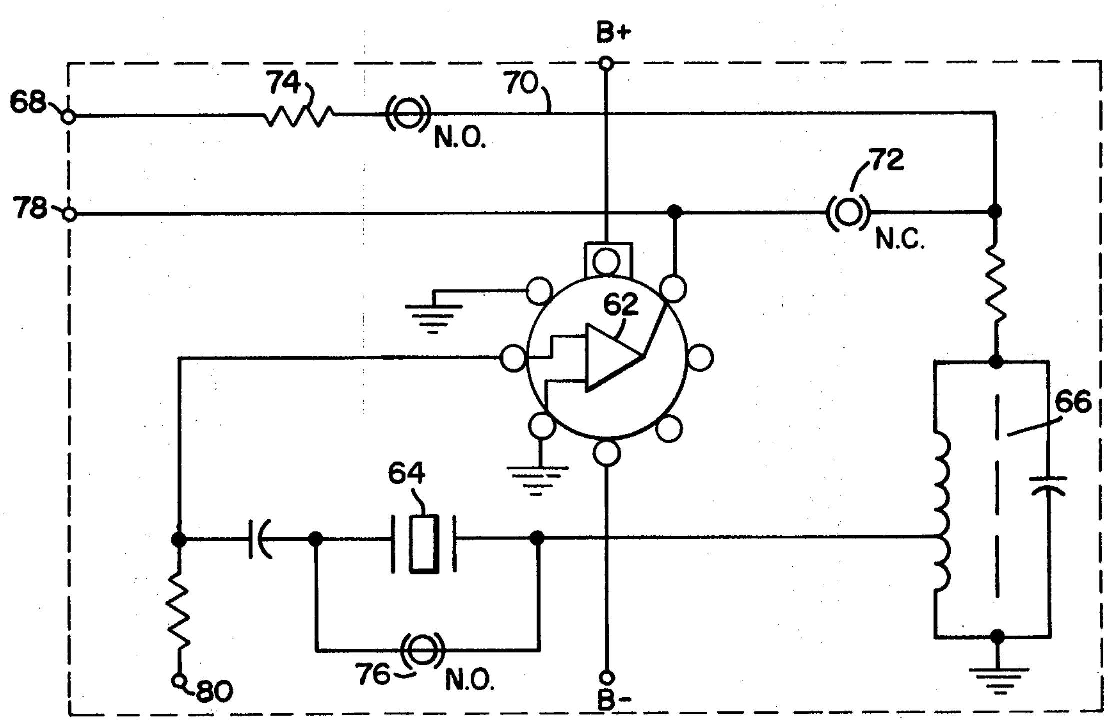
FIG. 3 is a circuit diagram of the clock circuit of this invention.

The ring counter 14 is enabled by a channel pulse generator 18 which in turn can function only in the presence of a channel enabling signal 20. The triggering of the flip-flop circuits 16 is accomplished by a master clock 24 common to all the channels of the PCM system. A preferred embodiment of such a master clock is shown in FIG. 3.

The ring counter 14 may be provided, if desired, with a spurious mode preventing device using a NAND gate 26. The NAND gate 26, which derives its inputs from the rails $\bar{A}$ and $\bar{C}$, prevents operation flip-flop **16*b* unless both the A section and the C section of the ring counter 14 are in the condition in which they must be at the proper operating time of flip-flop 16*b*. The output of flip-flop 16*d* is reversed to form the input of flip-flop 16*a*, so that eight conditions are produced per cycle of the ring counter 14**. Seven of these conditions constitute the sampling conditions of the seven telegraph inputs, whereas the eighth (unused) condition corresponds to the time slot into which the signalling bit will later be inserted.

Figure 2:
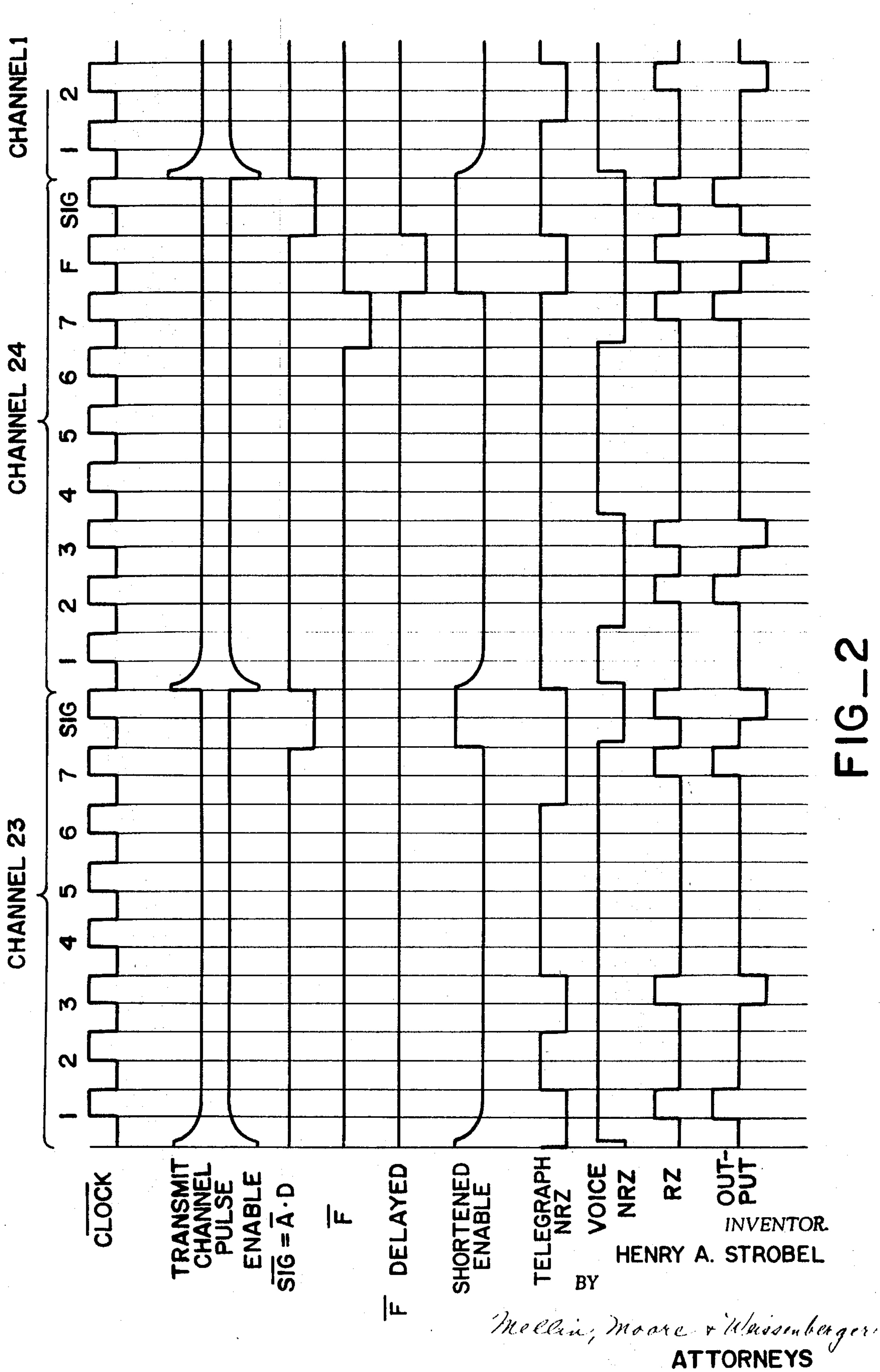
FIG. 2 is a time-amplitude diagram illustrating the wave forms appearing at various points in the apparatus of FIG. 1.

The output of NAND gates 12 is combined in a NAND gate 28 to form the inverse of a telegraph nonreturn-to-zero signal (TG $\overline{\text{NRZ}}$, see FIG. 2).

In order to prevent any spillover of the TG $\overline{\text{NRZ}}$ signal into the time slot reserved for signalling and framing, the TG $\overline{\text{NRZ}}$ signal is combined in a NOR gate 30 with a signal derived by combining a channel pulse signal with the inverse of a frame signal ($\bar{F}$) and the inverse of a signalling bit ($\overline{\text{SIG}}$). The output of NOR gate 30 is a pulse train representing the seven telegraph inputs in time-shared relationship when the telegraph channel is enabled. The $\bar{F}$ and $\overline{\text{SIG}}$ inputs to the combining NAND gate 32 may be derived through the inverter 34 and one-bit delay flip-flop 35 from the framing pulse generator 36 common to all channels and from NAND gate 38 connected to the ring counter 14. The delay of flip-flop 35 compensates for the early time position of the framing pulse generator output with respect to the bit pulses used in the system.

The voice $\overline{\text{NRZ}}$, which includes the signalling and frame information for the telegraph channels as well as for the voice channels is processed through NOR gate 40 whenever the inverter 39 signals the absence of the coincidence condition which enables gate 30; in other words, the $\overline{\text{NRZ}}$ pulse train 13 derived from gate 30 during the sampling of the telegraph lines, and from gate 40 at all other times. All the inputs from the 24 channels of a given PCM system are combined in line 42 and constitute one of the inputs of the AND gate 44. The AND gate is an inhibiting gate whose other input is derived from NAND gate 46. The latter combines a signal produced by AND gate 48 and representative of the time slot corresponding to line 7 of the telegraph input or the least significant bit of a voice input, with an alarm condition signal supplied to terminal 50. The function of gate 44 is to inhibit the transmission of the least significant or line 7 pulse in the event of an alarm condition.

The completed NRZ pulse train is processed through a converter and phase shift eliminator 52 which changes the non-return-to-zero (NRZ) signal into a return-to-zero (RZ) signal occupying the second half of each time slot as shown in FIG. 2. The action of converter 52 also eliminates the phase shift previously introduced into the circuit. The complete RZ pulse train is then converted to pulses of alternating polarity in the unipolar to bipolar converter 58 and is transmitted to the PCM transmission system through output 60.

FIG. 2 shows the circuitry of the convertible master clock used in this invention. In FIG. 2, 62 is an amplifier which, when the master clock is to be internally driven, serves as a comparator. With internal operation, the clock frequency is derived from a precision oscillating device such as a crystal oscillator 64, driven by the tank circuit 66.

When it is desired to operate the circuit from an external clock supplied at input 68 (which may be either the master clock of the telegraph system at central locations, or, at remote locations, a clock derived from an incoming signal), the switch 70 is closed and the switch 72 is opened. In this mode, the feedback loop between the comparator 62 and the tank circuit 66 is broken, and the tank circuit 66 is excited by the external clock.

The impedance of resistor 74 increases the Q of the tank circuit 66 so that it can be tuned to the precise frequency of the external clock. When an external clock is used, the crystal 64 is bypassed by closing the bypass switch 76. The amplifier 62 then becomes a squaring amplifier to produce a squared output in synchronism with the external clock supplied at 68, which squared output appears at terminal 78. Clocking for the converter circuitry of FIG. 1 is derived at a lower level through output 80.

Figure 4:
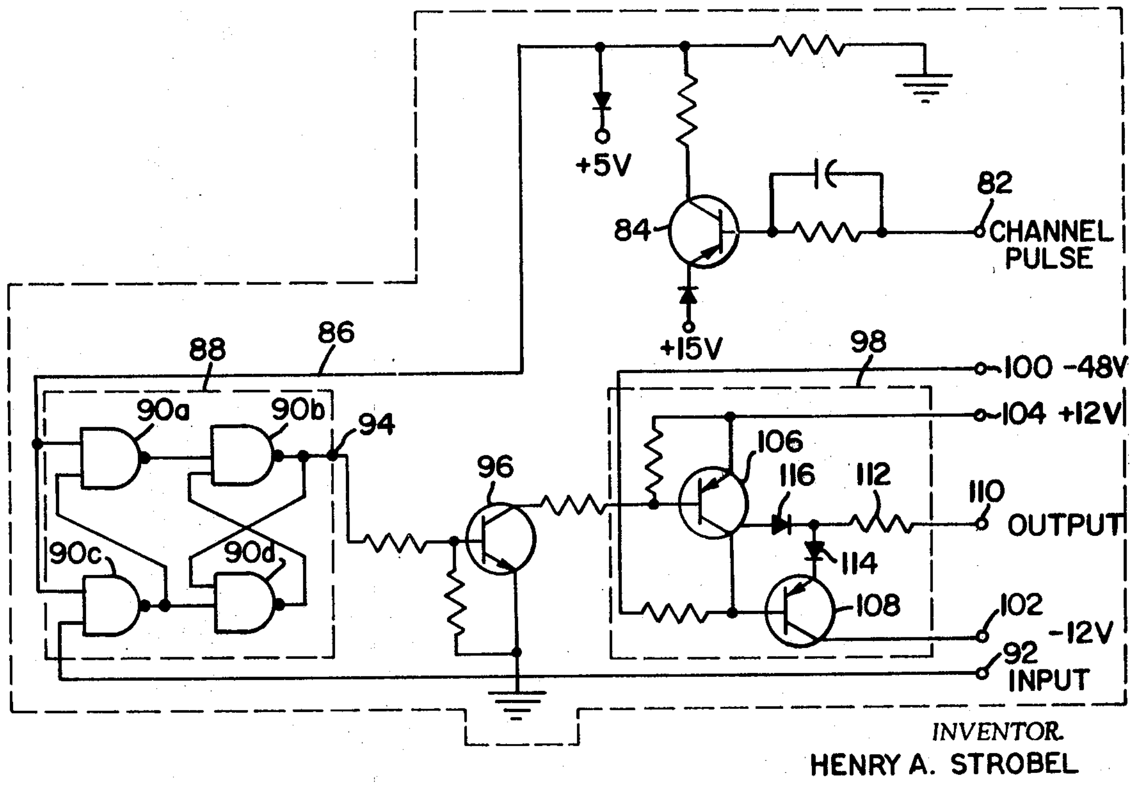
FIG. 4 is a circuit diagram of the telegraph signal receiver and logic level converter.

Turning now to FIG. 4, the incoming pulse train bit corresponding to a given telegraph line is received at terminal 92. The input signal drives the NAND gate **90*c* of a bistable latch circuit 88. The latch circuit 88 consists of four NAND gates 90*a* through 90*d*. The circuit is enabled by a channel pulse appearing at input 82 and fed to line 86 through inverter 84. The effect of the bistable latch circuit 88 is to establish at its output 94 whichever condition was present at the input 92** at the moment of sampling, and to maintain this condition until the next sampling takes place.

The output of latch circuit 88 is amplified by transistor 96 and is translated into a ±12 volt, 600 ohm telegraph signal by the logic level converter 98. The inputs to the logic level converter 98 are typically −48 v. at 100, −12 v. at 102, and +12 v. at 104. If a "mark" condition exists at the output of bistable latch 88, transistor 106 is cut off, and transistor 108 conducts. Current flow is therefore established from the output terminal 110 through resistor 112, diode 114, and transistor 108 to the negative 12 volt bus 102.

In the "space" condition, transistor 106 conducts and as a result cuts off transistor 108. Current flow then occurs from the positive 12 volt bus 104 through transistor 106, diode 116 and resistor 112 to the output 110. The impedance of resistor 112 plus that of one or the other of diodes 114, 116 totals the 600 ohms representing the standard line impedance.

I claim:

1. Apparatus for transmitting a plurality of discrete telegraph signals over a single channel of a multichannel PCM telephone system, comprising:
   a. means for recurrently enabling said channel in time-shared relation with the other channels of said system;
   b. means for sequentially sampling said plurality of telegraph signals while said channel is enabled;
   c. means for delaying the enabling of said channel with respect to the start of the time period allotted to said channel in said system;
   d. means for transmitting said samples while said channel is enabled but preventing transmission of said samples during the signalling and frame pulse times of said system; and
   e. means for combining said transmitted samples and signals from the other channels of said PCM system in time-shared relationship.

2. The apparatus of claim 1, further comprising means connected following said combining means for suppressing a predetermined one of said telegraph signals in each channel when said PCM system is in an alarm condition.

3. The apparatus of claim 1, in which at least one of said channels is a voice channel and at least one is a telegraph channel.

4. The apparatus of claim 1, in which said sampling means include logic level conversion means.

5. Apparatus for converting the pulses of the PCM signal appurtenant to one channel of a multichannel PCM system into telegraph signals, comprising:
   a. a plurality of bistable latch means, one for each telegraph signal, connected to be set by said PCM signal when enabled;
   b. timing means connected to said bistable latch means for cyclically enabling said latch means in synchronism with said pulses of said PCM signal;
   c. logic level conversion means driven by said bistable latch means to produce telegraph signals of predetermined impedance and logic level.

6. The apparatus of claim 5, further comprising pulse inverter means connected between the source of said PCM signals ans said latch means.

7. The apparatus of claim 6, in which said bistable latch means is a four-element, cross-connected NAND logic.